United States Patent Office 3,117,908
Patented Jan. 14, 1964

3,117,908
PHOSPHOROUS CONTAINING POLYCHLOROPROPENES AS PESTICIDES AND METHOD OF PREPARATION
Karoly Szabo, Yonkers, N.Y., and John Gary Brady, Campbell, Calif., assignors to Stauffer Chemical Company, New York, N.Y., a corporation of Delaware
No Drawing. Filed May 22, 1961, Ser. No. 111,472
9 Claims. (Cl. 167—22)

This invention relates to certain phosphorous containing polychloropropenes and in particular to 1-dialkoxyphosphinyl - 1,1,3,3 - tetrahaloisopropenyl dialkyl phosphates and to their preparation.

It is known that phosphites, such as trialkyl phosphites, react readily with compounds having a trichloromethyl group adjacent to a carbonyl function. The reaction may lead to a phosphate or a phosphonate although in some instances a mixture of these two products is obtained. The course of the reaction apparently depends on environmental factors and the chemical structure of the reactants. These organic phosphates and phosphonates are of interest because of their biological activity.

We have now discovered compounds in which the structure incorporates both a phosphate and a phosphonate radical and the provision of such compounds constitutes an object of this invention. Other objects and advantages of this invention will become apparent as the description proceeds.

In accordance with our invention, phosphorous compounds containing both a phosphate and phosphonate function can be obtained by condensing at least two equivalents of a trialkyl phosphite with one equivalent of hexahaloacetone. The reaction can be depicted formalistically by the following equation:

$$2(RO)_3-P + X_3C-C-CX_3 \longrightarrow$$
$$\qquad\qquad\qquad\quad \overset{\|}{O}$$

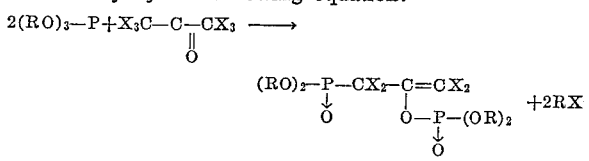

wherein R is an alkyl group of from 1 to 5 carbon atoms and X is halogen such as chlorine, bromine or the like. In carrying out the condensation, we have found that generally excellent results are obtained by reacting two moles of the lower trialkyl phosphite with hexachloroacetone in the presence of an inert solvent such as an aliphatic saturated hydrocarbon or an aromatic hydrocarbon. The solvents are preferably liquid under the reaction conditions. Specific examples of suitable solvents include hexane, heptane, octane, benzene, toluene, xylene and the like.

Exemplary trialkyl phosphites are the lower members of the series and include trimethylphosphite, triethylphosphite, tri-n-butylphosphite, tri-iso-butylphosphite, tri-iso-amylphosphite, triamylphosphite, etc.

As previously pointed out, the compounds as herein described are characterized by the presence of two phosphorus moieties per molecule, a phosphate radical on the one hand, and a phosphonate radical on the other. This dual phosphorous configuration was ascertained by means of both IR spectrum and elemental or chemical analysis. It can thus be seen that our compounds represent structures which have not hitherto been contemplated.

In order to describe the compounds and process of making them in greater detail, reference is made to the following examples which are submitted for the purpose of illustration only and are not to be construed as placing or imposing any limitations on the invention. It is furthermore to be understood that, without departing from the spirit or scope of the invention, variations of practicing same will occur to those skilled in the art.

EXAMPLE 1

*1,1,3,3-Tetrachloro-1-Diethoxyphosphinylisopropenyl Diethyl Phosphate*

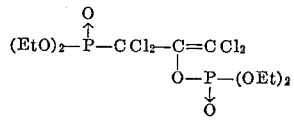

34 g. of triethylphosphite was added gradually to a mixture of 26.6 g. of hexachloroacetone contained in 100 ml. of benzene. A vigorous reaction ensued accompanied by the evolution of heat which continued during the first half of the addition. After all of the phosphite had been added, the mixture was brought to reflux and maintained at this point for one half hour. The reaction was completed when the evolution of ethylchloride had ceased after which the mixture was transferred to a distillation flask and the solvent and excess triethylphosphite removed by distillation. This left a residue of a yellow oil which amounted to about 48 g.; $N_D^{25}=1.4764$. The crude product was purified by distillation in high vacuo and the fraction boiling at 136° C. at 0.1 mm. was collected. The refractive index of the purified material showed no substantial change thus indicating a high degree of purity even in the crude product.

EXAMPLE 2

*1-Di-n-Butoxyphosphinyl-1,1,3,3-Tetrachloroisopropenyl Di-n-Butyl Phosphate*

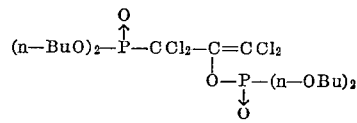

Using the procedure as described in Example 1, 25 g. of tri-n-butylphosphite was added to a mixture of 13.3 g. of hexachloroacetone contained in 100 ml. of heptane. Since this reaction is exothermic, the temperature was regulated so as not to exceed 60° C. After the addition was completed, the mixture was heated to 100° C. for 0.5 hrs. and then allowed to cool. The solvent was removed in vacuo by heating to 130° C. at 12 mm. pressure. The residue was a yellow oil with a $N_D^{25}$ of 1.4657, the yield amounting to 94.5% representing 25.5 g. of product.

EXAMPLE 3

*1,1,3,3-Tetrachloro-Di-n-Dipropoxyphosphinylisopropenyl Di-n-Propyl Phosphate*

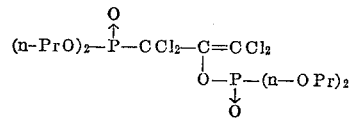

Using the procedure as set forth in Example 1, but substituting tri-n-propylphosphite in place of the triethylphosphite of the earlier example, the reactants and the proportions hereof were employed in the same manner as already described and the results obtained essentially paralleled those of the previous examples.

The phosphorus containing chloropropene derivatives of this invention are biologically active compounds and have been found effective in controlling a variety of organisms. In particular, we have found our new structures to be excellent pesticides and are especially effective against insects and fungi.

The biological activity of the new class of compounds may be illustrated by the following test data. Using 1,1,3,3 - tetrachloro-1 - diethoxyphosphinylisopropenyl diethyl phosphate of Example 1, this compound gave 100% kill at 0.1% concentration on such insects as *Periplaneta americana*, *Oncopeltus fasciatus* and *Tribolium confusum*. It also exhibits bactericidal activity below 50 p.p.m. concentrations on *Erwinia amylovora* and *Staph. aureus*. It is also lethal to fungi, being effective against *Fusarium solani* and *Penicillium* sp. in concentrations as low as 115 p.p.m.

The compounds of the present invention may be applied to pest habitats in a variety of ways. Thus they may be sprayed on, dissolved in solvents such as acetone, or the like. They may also be mixed with solid carriers as represented by finely divided clay or bentonite. Mixtures of the material on a carrier may also be incorporated into aqueous dispersions by the use of appropriate wetting agents.

We claim:

1. A 1-dialkoxyphosphinyl-1,1,3,3-tetrahaloisopropenyl dialkyl phosphate of the formula:

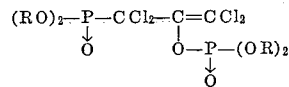

where R represents an alkyl group of from 1 to 5 carbon atoms.

2. 1,1,3,3-tetrachloro-1-diethoxyphosphinylisopropenyl diethyl phosphate.

3. 1-di-n-butoxyphosphinyl-1,1,3,3 - tetrachloroisopropenyl di-n-butyl phosphate.

4. A process of preparing a 1-dialkoxyphosphinyl-1,1,3,3-tetrahaloisopropenyl dialkyl phosphate of the formula:

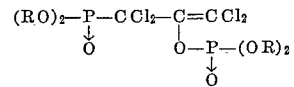

wherein R represents an alkyl group of from 1 to 5 carbon atoms which comprises reacting two equivalents of trialkylphosphite having from 1 to 5 carbon atoms with at least one equivalent of hexachloroacetone.

5. The process according to claim 4 wherein the condensation is carried out in the presence of an inert solvent.

6. The process according to claim 5 wherein the inert solvent is a saturated aliphatic hydrocarbon.

7. The process according to claim 5 wherein the inert solvent is an aromatic hydrocarbon.

8. A process for inhibiting the growth of pests which comprises applying to a pest habitat a small but effective amount of a compound having the formula:

$(RO)_2-P-CCl_2-C=CCl_2$
        $\downarrow$        $|$
        $O$        $O-P-(OR)_2$
                         $\downarrow$
                         $O$ wherein R represents an alkyl group of from 1 to 5 carbon atoms.

9. A process for inhibiting the growth of pests which comprises applying to a pest habitat a small but effective amount of 1,1,3,3-tetrachloro - 1 - diethoxyphosphinylisopropenyl diethyl phosphate.

References Cited in the file of this patent

UNITED STATES PATENTS

| | | |
|---|---|---|
| 2,573,568 | Harman et al. | Oct. 30, 1951 |
| 2,934,469 | Baker et al. | Apr. 26, 1960 |
| 2,952,701 | McDonnell et al. | Sept. 13, 1960 |
| 2,957,905 | Gaertner | Oct. 25, 1960 |
| 2,970,940 | Jones et al. | Feb. 7, 1961 |
| 2,983,644 | Willard et al. | May 9, 1961 |

OTHER REFERENCES

Angew. Chem. 72, Jahrg., 1960, pages 236–249, page 240 relied on.